United States Patent
Maron

(10) Patent No.: US 7,865,871 B2
(45) Date of Patent: Jan. 4, 2011

(54) GENERATING CODE TO BE DEPLOYED IN AN APPLICATION SERVER BY INTROSPECTING AN INPUT CLASS INCLUDED IN AN ARCHIVE FILE

(75) Inventor: Jonathan Maron, Marlton, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 1047 days.

(21) Appl. No.: 10/730,900

(22) Filed: Dec. 10, 2003

(65) Prior Publication Data

US 2005/0132339 A1    Jun. 16, 2005

(51) Int. Cl.
    G06F 9/44    (2006.01)
(52) U.S. Cl. ........................... 717/108; 717/106
(58) Field of Classification Search .......... 717/106–109
    See application file for complete search history.

(56) References Cited

U.S. PATENT DOCUMENTS

| | | | |
|---|---|---|---|
| 6,754,659 B2 * | 6/2004 | Sarkar et al. ................. | 707/10 |
| 6,922,695 B2 * | 7/2005 | Skufca et al. ................ | 707/10 |
| 6,925,631 B2 * | 8/2005 | Golden ....................... | 717/115 |
| 6,990,654 B2 * | 1/2006 | Carroll, Jr. .................. | 717/109 |
| 7,000,218 B2 * | 2/2006 | Gerken ....................... | 717/106 |
| 7,159,224 B2 * | 1/2007 | Sharma et al. ............... | 719/310 |
| 7,249,345 B2 * | 7/2007 | Zorc .......................... | 717/106 |
| 2003/0158832 A1 * | 8/2003 | Sijacic et al. ................. | 707/1 |

OTHER PUBLICATIONS

Sundaresan et al., "Algorithms and Programming Models for Efficient Representation of XML for Internet Applications," 2001, ACM, p. 366-375.*
Turau, Volker, "A framework for automatic generation of web-based data entry applications based on XML," 2002, ACM, p. 1121-1126.*

* cited by examiner

*Primary Examiner*—Wei Y Zhen
*Assistant Examiner*—Qing Chen
(74) *Attorney, Agent, or Firm*—Hanify & King, P.C.

(57) ABSTRACT

A system and method for generating code that reduces the cost for large projects and that provides easier and quicker ways of finding errors and making modifications is disclosed. A method of generating code to be deployed in an application server comprises the steps of receiving an archive file to be deployed, introspecting an input class included in the archive file to generate information relating to the input class, generating a markup language description of the input class based on the generated information relating to the input class, creating an event handler for a method node found in the markup language description, registering the event handler, parsing the markup language description and invoking the registered event handler, and generating output code using the invoked event handler.

39 Claims, 4 Drawing Sheets

US 7,865,871 B2

GENERATING CODE TO BE DEPLOYED IN AN APPLICATION SERVER BY INTROSPECTING AN INPUT CLASS INCLUDED IN AN ARCHIVE FILE

FIELD OF THE INVENTION

The present invention relates to a method, system, and computer program product for generating code from compiled code deployed to an application server.

BACKGROUND OF THE INVENTION

Many JAVA® technologies currently require the generation of classes based on some input class. A prime example is ENTERPRISE JAVA BEANS® (EJBs®), which require the generation of a particular application server's container classes to wrap the developer supplied bean class.

To date this process of code generation has largely been undertaken with invocations of methods that use printout statements to build the required files, generally one file at a time. In addition, most of these generation facilities attempt to create a complete file at once rather than taking a more modular approach to the assembly of the generated file. Although this process works for small projects, it quickly becomes unwieldy for larger projects, leading to increased expense. In addition, tracking down errors in code generation or making modifications to accommodate new requirements is a difficult, expensive, and time-consuming process since the correct method and the correct print statement needs to be found amongst many similar looking statements. A need arises for a technique by which code can be generated that reduces the cost for large projects and that provides easier and quicker ways of finding errors and making modifications.

SUMMARY OF THE INVENTION

The present invention is a system and method for generating code that reduces the cost for large projects and that provides easier and quicker ways of finding errors and making modifications. Whereas the prior art techniques were rather unwieldy and cumbersome, the present invention provides a modular approach to code generation—event handlers handle precise segments of the code generation process rather than attempting to create a complete file. Thus, the whole code generation engine within an application becomes more maintainable and reliable, reducing cost and time spent.

A more maintainable and reliable code generation facility provides the capability to significantly decrease any generation errors that may occur and that may ultimately lead to customer dissatisfaction. In addition, the ability to quickly and effectively modify the code generation process will allow the server to adapt to new generation requirements for particular technologies quickly, thus significantly cutting down on time-to-market for new generation dependent features.

In addition the present invention has potential applicability in many code generation arenas such as CORBA ORBs, XML code bindings such as JAXB, etc.

In one embodiment of the present invention, a method of generating code to be deployed in an application server comprises the steps of receiving a compiled file to be deployed, introspecting this input class to generate information relating to the input class, generating a markup language description of the input class based on the generated information relating to the input class, creating an event handler for a method node found in the markup language description, registering the event handler, parsing the markup language description and invoking the registered event handler, and generating output code using the invoked event handler.

In one aspect of the present invention, the archive file is a compiled ENTERPRISE JAVA BEAN® (EJB®) file. The step of introspecting an input class included in the archive file may comprise the steps of extracting information identifying methods included in the input class and for each method, extracting information relating to parameters of the method and exceptions generated by the method. The step of generating a markup language description of the input class may comprise the step of generating an Extensible Markup Language description of the input class based on the generated information relating to the input class. The step of creating an event handler may comprise the step of creating a programming language implementation of a Simple Application Programming Interface for Extensible Markup Language (SAX) event handler for a method node found in the class' XML description. The step of parsing the XML description and invoking the registered event handlers may comprise the step of parsing the markup language description using a SAX parser and invoking the registered SAX event handlers.

In one aspect of the present invention, the step of creating an event handler comprises the step of creating a plurality of event handlers for a method node found in the markup language description. The step of registering the event handler may comprise the step of registering each of the plurality of event handlers. The step of parsing the markup language description and invoking the registered event handler may comprise the step of parsing the markup language description and invoking each of the plurality of registered event handlers. The step of generating output code may comprise the step of generating output code using each of the plurality of invoked event handlers in parallel.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

The present invention is a system and method for generating code that reduces the cost for large projects and that provides easier and quicker ways of finding errors and making modifications. In a preferred embodiment, the present invention relies on the Simple API for XML (SAX) to drive the generation of code. SAX is an event-driven, serial-access mechanism for accessing XML documents. SAX was the first widely adopted API for XML in JAVA®, and is a "de facto" standard. A typical version of SAX contains a number of core classes and interfaces together with optional helper classes and demonstration classes. SAX is described in greater detail below.

Figure 1:
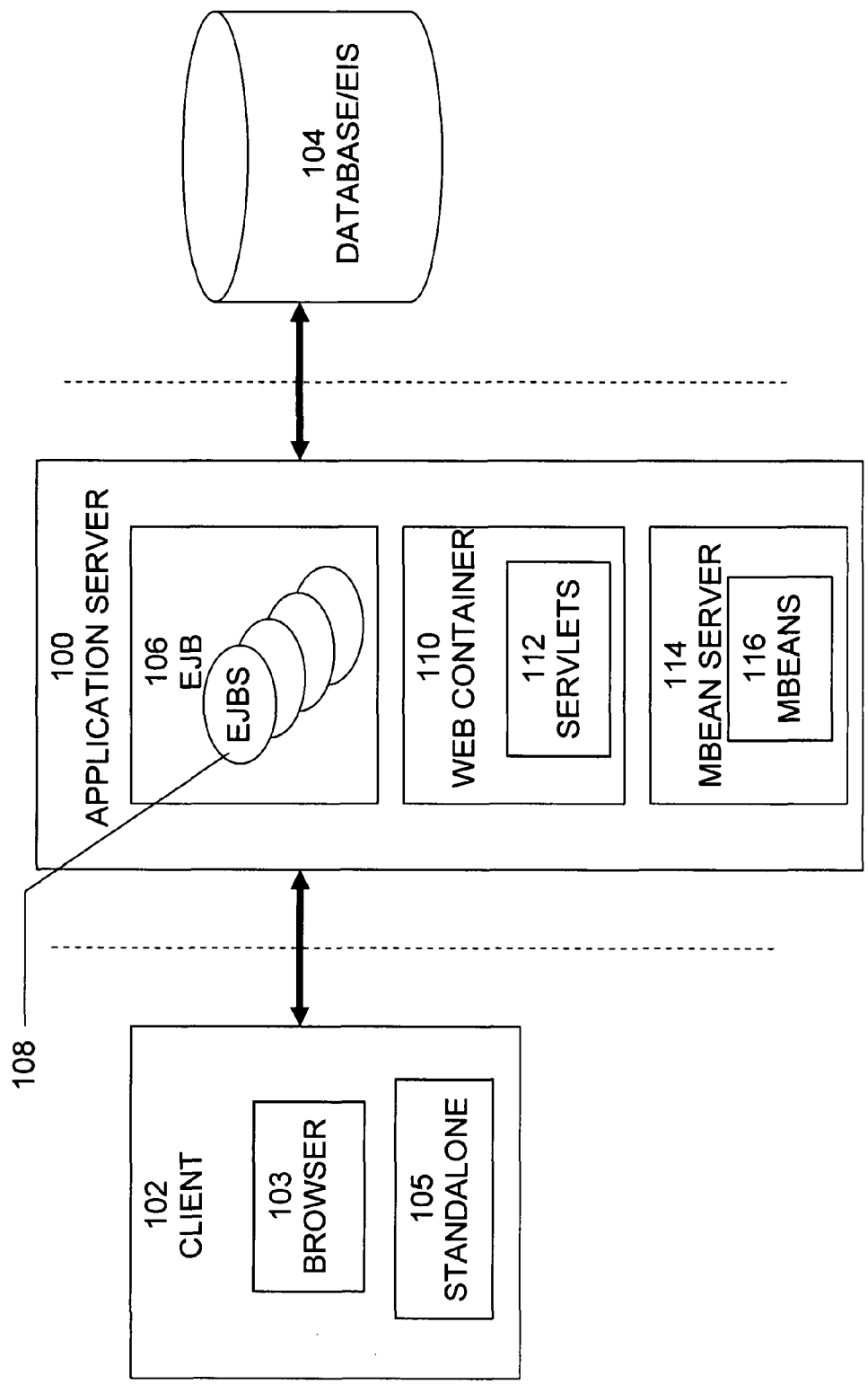
FIG. 1 is an exemplary block diagram of an application server, in which the present invention may be implemented.

An exemplary block diagram of an application server 100, in which the present invention may be implemented, is shown in FIG. 1. The exemplary application server shown in FIG. 1 is based on the well-known ORACLE® application server. However, this application server is merely an example. The present invention is applicable to other application servers as well, such as those from IBM®, MICROSOFT®, etc.

An Application Server generally interacts with both clients 102 (including browser 103 and standalone 105) and back-end EIS systems 104. The application server provides an Enterprise Java Bean (EJB) container 106 to facilitate access to EIS and/or database systems 104. A container is a controlled run-time environment for an application component (e.g., an EJB 108) that also provides an interface to components executing within the container. Also, containers provide basic management functionality such as life cycle management of the components, security, deployment, threading, etc. An EJB 108 is a software component that implements the interfaces defined by its respective container. The interfaces of the EJB 108 are defined in a manner that permits the functionality of the respective EJB 108 to be accessed in a modular and dynamic manner.

The application server 100 also provides a Web container 110. The Web container 110 may provide a controlled run-time environment for components that interact with a client. For example, servlet components 112 (persistent Web server processes that are capable of processing multiple requests) may be implemented to dynamically create hypertext markup language (HTML) or XML responses to requests from clients. Other suitable components may be implemented within the Web container.

In general, the middle tier may be implemented utilizing "middleware servers" or "application servers." An application server typically includes many dissimilar services that are appropriate to create a stable and robust environment for enterprise applications. A service represents a predefined task that is provided by a piece of software in a well defined and predicable manner. Typically, an application server may comprise services that implement management functionality, such as MBean server 114, in which management services may be implemented as MBeans 116. The management services of the application server may be responsible for starting, registering, monitoring, and stopping services. Management services may perform other tasks such as thread pooling, security management, state management, class loading, load-balancing, dynamic application launching, and/or the like. Secondly, an application server may provide a basic set of services that may be commonly utilized by a wide range of enterprise applications (e.g., hypertext transfer protocol (HTTP) processing). Third, an application server may comprise application specific services that implement the business or other logic of a given enterprise application.

Figure 2:
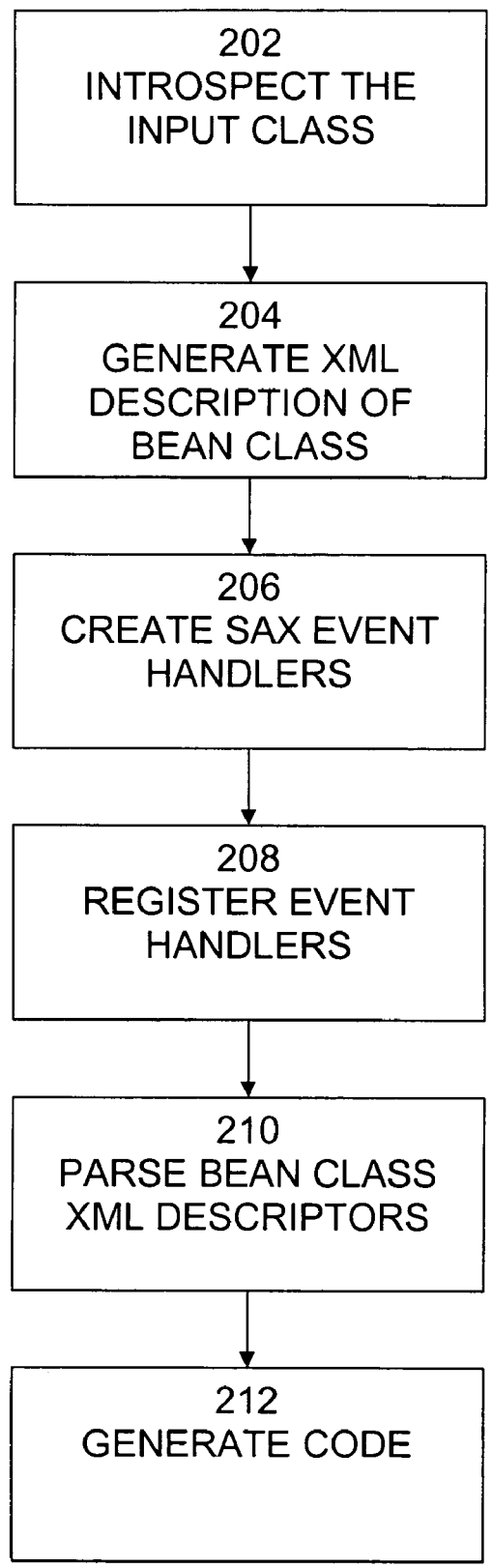
FIG. 2 is an exemplary flow diagram of a process for generating code according to the present invention.

An exemplary flow diagram of a process 200 for generating code according to the present invention is shown in FIG. 2. Typically, a bean archive file is deployed to an application server. For example, if the bean archive file contains an ENTERPRISE JAVA BEAN® (EJB®) implementation, the archive file includes one or more classes of objects. Process 200 begins with step 202, in which the input class, that is the object class included in the archive file, is introspected. Introspection involves extracting information relating to the objects, methods, etc., that are included in the class. For example, information identifying methods included in the input class may be extracted and for each method, information relating to parameters of the method are extracted. In JAVA®, introspection may be performed using the JAVA® Reflection API.

In step 204, an XML description of the JAVA® bean class is generated based on the class information gathered via the introspection performed in step 202. For example,

```
<bean name="MyBean" package="MyPackage">
<method name="method1">
<param type="java.lang.String" name="param1"/>
<exception type="MyPackage.MyException"/>
<return type="void"/>
</method>
</bean>
```

In step 206, SAX event handlers are created for the appropriate nodes in the XML code. For example, in the example above, a <method> node handler would be at least one of the handlers registered. These event handlers can then drive the generation of the code by analyzing the information of the node and any relevant child nodes. Based on this analysis the code can drive the generation process in any way a developer would see fit, such as:

Invocations of print statements
Templating technologies such as XSL.

In step 208, the event handlers are registered with a SAX parser and, in step 210, the parsing of the JAVA® bean class XML descriptor commences. As the event handlers are invoked by the parser, step 212, the code generation proceeds. Note that this facility could potentially be leveraged to generate more than one file in parallel if, for example, an event handler leverages multiple templates. For example, if a method affects multiple files, all handlers for a method may be invoked at once and the code for each file generated in parallel.

Figure 3:
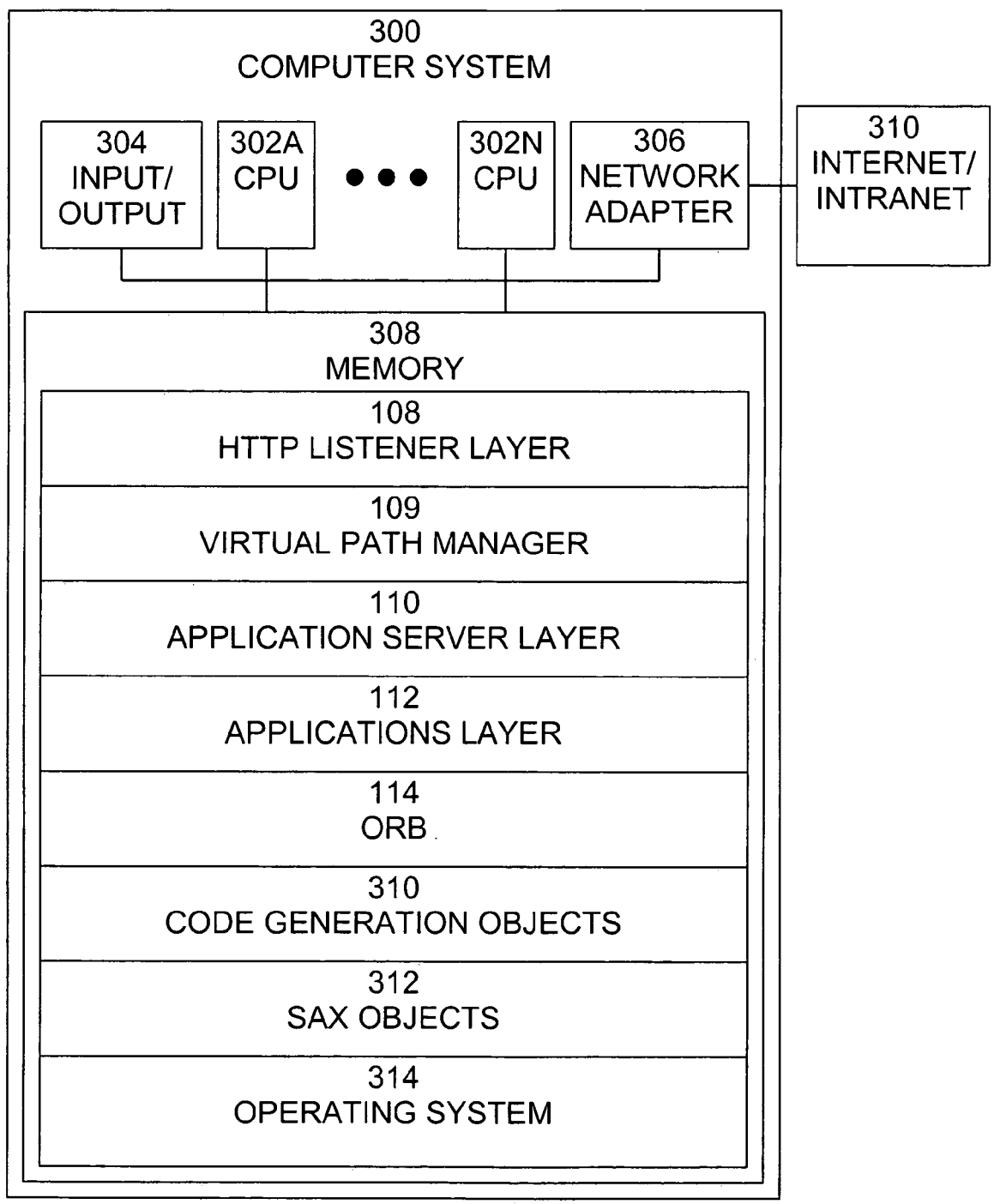
FIG. 3 is an exemplary block diagram of a computer system, in which an application server, such as that shown in FIG. 1, may be implemented.

An exemplary block diagram of a computer system 300, in which an application server, such as that shown in FIG. 1, may be implemented, is shown in FIG. 3. System 300 is typically a programmed general-purpose computer system, such as a personal computer, workstation, server system, and mini-computer or mainframe computer. System 300 includes one or more processors (CPUs) 302A-302N, input/output circuitry 304, network adapter 306, and memory 308. CPUs 302A-302N execute program instructions in order to carry out the functions of the present invention. Typically, CPUs 302A-302N are one or more microprocessors, such as an INTEL PENTIUM® processor. FIG. 3 illustrates an embodiment in which System 300 is implemented as a single multi-processor computer system, in which multiple processors 302A-302N share system resources, such as memory 308, input/output circuitry 304, and network adapter 306. However, the present invention also contemplates embodiments in which System 300 is implemented as a plurality of networked computer systems, which may be single-processor computer systems, multi-processor computer systems, or a mix thereof.

Input/output circuitry 304 provides the capability to input data to, or output data from, database/System 300. For example, input/output circuitry may include input devices, such as keyboards, mice, touchpads, trackballs, scanners, etc., output devices, such as video adapters, monitors, printers, etc., and input/output devices, such as, modems, etc. Network adapter 306 interfaces database/System 300 with Internet/intranet 310. Internet/intranet 310 may include one or more standard local area network (LAN) or wide area network (WAN), such as Ethernet, Token Ring, the Internet, or a private or proprietary LAN/WAN.

Memory 308 stores program instructions that are executed by, and data that are used and processed by, CPU 302 to perform the functions of system 300. Memory 308 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the example shown in FIG. 3, memory 308 includes HTTP listener layer 108, virtual path manager 109, application server layer 110, applications layer 112, ORB 114, code generation objects 310, SAX objects 312, and operating system 314. HTTP listener layer 108 is made up of listeners, the adapter interface, and dispatchers. Listeners are HTTP servers; they handle incoming requests and route them to the dispatcher. The dispatcher forwards requests to the virtual path manager 109. The virtual path manager maps a request to a cartridge type and passes this information back to the dispatcher. The virtual path manager also passes back authentication requirements to the dispatcher. The Application Server layer 110 provides resource management in handling requests for applications deployed as cartridges on the server. It provides a common set of components for managing these applications. These components include load balancing, logging, automatic failure recovery, security, directory, and transaction components. The Applications layer 112 is made up of applications, cartridges, and cartridge servers. Applications and cartridges are the two main objects that you use when building applications for the application server environment. ORB 114 acts as the middleware between clients and servers. Code generation objects 310 perform the steps of and store the data for code generation process 200, shown in FIG. 2. SAX objects 312 implement the SAX functionality, described below. Operating system 314 provides overall system functionality.

As shown in FIG. 3, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

SAX is an event-driven, serial-access mechanism for accessing XML documents. SAX was the first widely adopted API for XML in JAVA®, and is a "de facto" standard. A typical version of SAX contains a number of core classes and interfaces together with optional helper classes and demonstration classes.

Figure 4:
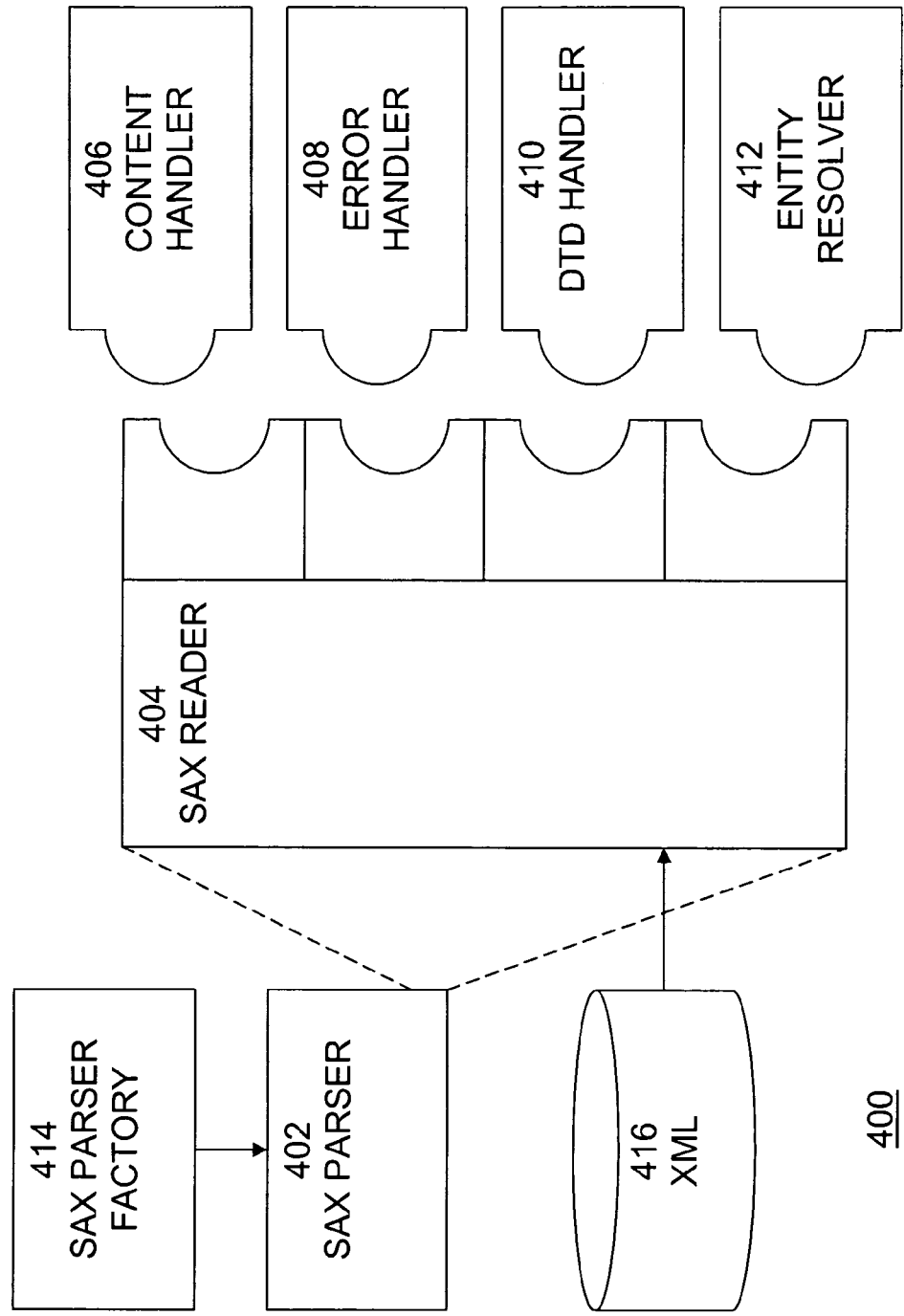
FIG. 4 is an exemplary architecture of a SAX implementation that may be used by the present invention.

An exemplary architecture of a SAX implementation 400 is shown in FIG. 4. The parser 402 wraps a SAXReader object 404. When the parser's 402 parse( ) method is invoked, the reader 404 invokes one of several callback methods implemented in the application. Those methods are defined by the interfaces ContentHandler 406, ErrorHandler 408, DTDHandler 410, and EntityResolver 412.

Here is a summary of the key SAX APIs:

SAXParserFactory 414

A SAXParserFactory 414 object creates an instance of the parser determined by the system property, javax.xml.parsers.SAXParserFactory.

SAXParser 402

The SAXParser interface 402 defines several kinds of parse( ) methods. In general, you pass an XML data source 416 and a DefaultHandler object to the parser, which processes the XML 416 and invokes the appropriate methods in the handler object.

SAXReader 404

The SAXParser 402 wraps a SAXReader 404. Typically, you don't care about that, but every once in a while you need to get hold of it using SAXParser's getXMLReader( ), so you can configure it. It is the SAXReader 404 that carries on the conversation with the SAX event handlers you define.

DefaultHandler

Not shown in FIG. 4, a DefaultHandler implements the ContentHandler 406, ErrorHandler 408, DTDHandler 410, and EntityResolver 412 interfaces (with null methods), so you can override only the ones you're interested in.

ContentHandler 406

Methods like startDocument, endDocument, startElement, and endElement are invoked when an XML tag is recognized. This interface also defines methods characters and processing instruction, which are invoked when the parser encounters the text in an XML element or an inline processing instruction, respectively.

ErrorHandler 408

Methods error, fatalError, and warning are invoked in response to various parsing errors. The default error handler throws an exception for fatal errors and ignores other errors (including validation errors). That's one reason you need to know something about the SAX parser, even if you are using the DOM. Sometimes, the application may be able to recover from a validation error. Other times, it may need to generate an exception. To ensure the correct handling, you'll need to supply your own error handler to the parser.

DTDHandler 410

Defines methods you will generally never be called upon to use. Used when processing a DTD to recognize and act on declarations for an unparsed entity.

EntityResolver 412

The resolveEntity method is invoked when the parser must identify data identified by a URI. In most cases, a URI is simply a URL, which specifies the location of a document, but in some cases the document may be identified by a URN—a public identifier, or name, that is unique in the Web space. The public identifier may be specified in addition to the URL. The EntityResolver can then use the public identifier instead of the URL to find the document, for example to access a local copy of the document if one exists. A typical application implements most of the ContentHandler methods, at a minimum. Since the default implementations of the interfaces ignore all inputs except for fatal errors, a robust implementation may want to implement the ErrorHandler methods, as well.

These SAX classes and interfaces fall into groups:

Interfaces implemented by the parser:

Parser and AttributeList (required), and Locator (optional)

Interfaces implemented by the application:

DocumentHandler, ErrorHandler, DTDHandler, and EntityResolver (all optional: DocumentHandler will the most important one for typical XML applications)

Standard SAX classes:

InputSource, SAXException, SAXParseException, HandlerBase

Optional JAVA®-specific helper classes:

ParserFactory, AttributeListImpl, and LocatorImpl

JAVA® demonstration classes in the nul package:

SystemIdDemo, ByteStreamDemo, CharacterStreamDemo, and EntityDemo

Interfaces for Parser Writers:

A SAX-conformant XML parser needs to implement only two or three simple interfaces; in fact, it is even possible (and quite common) to implement all of these interfaces in a single class, if desired.

Parser

This is the main interface to a SAX parser: it allows the user to register handlers for callbacks, to set the locale for error reporting, and to start an XML parse.

AttributeList

This simple interface allows users to iterate through an attribute list—the parser can implement it in the same class as the SAX driver, or implement it in a separate class (it does not need to be persistent). There is a convenience implementation available in the org.xml.sax.helpers.AttributeListImpl.

Locator

This simple interface allows users to find the current location in the XML source document—the parser can implement it in the same class as the driver, or implement it in a second class (it does not need to be persistent).

Interfaces for Application Writers

A SAX application may implement any or none of the following interfaces, as required (simple XML applications may need only DocumentHandler and possibly ErrorHandler). An application can implement all of these interfaces in a single class, if desired.

DocumentHandler

This is the interface that applications will probably use the most—in many cases, it is the only one that they will need to implement. If an application provides an implementation of this interface, it will receive notification of basic document-related events like the start and end of elements. It is this interface that will be implemented to drive the code generation in this invention.

ErrorHandler

If an application needs to use special error handling, then it must provide an implementation of this interface.

DTDHandler

If an application needs to work with notations and unparsed (binary) entities, it must implement this interface to receive notification of the NOTATION and ENTITY declarations.

EntityResolver

If an application needs to do redirection of URIs in documents (or other types of custom handling), it must provide an implementation of this interface.

Standard SAX Classes

SAX consists mostly of interfaces rather than classes, but the interfaces refer to two standard exception classes, and a third is provided for universal convenience. These classes are useful for both parser and application writers.

InputSource

This class contains all of the necessary information for a single input source, including a public identifier, system identifier, byte stream, and character stream (as appropriate). The application must instantiate at least one InputSource for the Parser, and the EntityHandler may instantiate others.

SAXException

This class represents a general SAX exception.

SAXParseException

This class represents a SAX exception tied to a specific point in an XML source document.

HandlerBase

This class provides default implementations for DocumentHandler, ErrorHandler, DTDHandler, and EntityResolver: parser writers can use this to provide a default implementation when the user does not specify handlers, and application writers can subclass this to simplify handler writing.

JAVA®-Specific Helper Classes

These classes are not part of the core SAX distribution, and may not be available in SAX implementations in other languages: they are provided simply as a convenience for JAVA® programmers.

ParserFactory

An application can use the static methods in this class to load SAX parsers dynamically at run time, based on the class name.

AttributeListImpl

An application can use this convenience class to make a persistent copy of an AttributeList, or parser can use it to supply a default implementation of AttributeList to the application.

LocatorImpl

An application can use this convenience class to make a persistent snapshot of a Locator's values at a specific point in the parse.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of automatically generating code to be deployed in an application server, comprising the steps of:
receiving an archive file to be deployed, wherein the archive file includes at least one input class;
introspecting an input class included in the archive file, wherein introspecting the input class included in the archive file includes automatically generating information relating to the input class by extracting information identifying methods included in the input class; and for each method, extracting information relating to parameters of the method including at least a name and a type of each parameter;
automatically generating a markup language description of the input class based on the extracted information identifying methods included in the input class; and for each method, the extracted information relating to parameters of the method including at least a name and a type of each parameter;
creating an event handler that leverages multiple templates for a method node found in the markup language description;
registering the event handler;
parsing the markup language description and invoking the registered event handler; and
automatically generating output code using the invoked event handler in parallel.

2. The method of claim 1, wherein the step of automatically generating a markup language description of the input class comprises the step of:
automatically generating an Extensible Markup Language description of the input class based on the extracted information identifying methods included in the input class; and for each method, the extracted information relating to parameters of the method including at least a name and a type of each parameter.

3. The method of claim 2, wherein the step of creating an event handler comprises the step of:
creating a Simple Application Programming Interface for Extensible Markup Language event handler that leverages multiple templates for a method node found in the Extensible Markup Language description.

4. The method of claim 3, wherein the step of registering the event handler comprises the step of:
registering the created Simple Application Programming Interface for Extensible Markup Language event handler for a method node found in the Extensible Markup Language description.

5. The method of claim 4, wherein the step of parsing the markup language description and invoking the registered event handler comprises the step of:
parsing the Extensible Markup Language description using a Simple Application Programming Interface for Extensible Markup Language parser and invoking the registered Simple Application Programming Interface for Extensible Markup Language event handler.

6. The method of claim 1, wherein the step of creating an event handler comprises the step of:
creating a plurality of event handlers that leverage multiple templates for a method node found in the markup language description.

7. The method of claim 6, wherein the step of registering the event handler comprises the step of:
registering each of the plurality of event handlers.

8. The method of claim 7, wherein the step of parsing the markup language description and invoking the registered event handler comprises the step of:
parsing the markup language description and invoking each of the plurality of registered event handlers.

9. The method of claim 8, wherein the step of automatically generating output code comprises the step of:
automatically generating output code using each of the plurality of invoked event handler in parallel.

10. The method of claim 9, wherein the step of automatically generating a markup language description of the input class comprises the step of:
automatically generating an Extensible Markup Language description of the input class based on the extracted information identifying methods included in the input class; and for each method, the extracted information relating to parameters of the method including at least a name and a type of each parameter.

11. The method of claim 10, wherein the step of creating a plurality of event handlers comprises the step of:
creating a plurality of Simple Application Programming Interface for Extensible Markup Language event handlers that leverage multiple templates for a method node found in the Extensible Markup Language description.

12. The method of claim 11, wherein the step of registering each of the plurality of event handlers comprises the step of:
registering the plurality of created Simple Application Programming Interface for Extensible Markup Language event handlers for a method node found in the Extensible Markup Language description.

13. The method of claim 12, wherein the step of parsing the markup language description and invoking the registered event handler comprises the step of:
parsing the Extensible Markup Language description using a Simple Application Programming Interface for Extensible Markup Language parser and invoking the plurality of registered Simple Application Programming Interface for Extensible Markup Language event handlers.

14. A system for automatically generating code to be deployed in an application server comprising:
a processor operable to execute computer program instructions;
a memory operable to store computer program instructions executable by the processor; and
computer program instructions stored in the memory and executable to perform the steps of:
receiving an archive file to be deployed, wherein the archive file includes at least one input class;
introspecting an input class included in the archive file, wherein introspecting the input class included in the archive file includes automatically generating information relating to the input class by extracting information identifying methods included in the input class; and for each method, extracting information relating to parameters of the method including at least a name and a type of each parameter;
automatically generating a markup language description of the input class based on the extracted information identifying methods included in the input class; and for each method, the extracted information relating to parameters of the method including at least a name and a type of each parameter;
creating an event handler that leverages multiple templates for a method node found in the markup language description;
registering the event handler;
parsing the markup language description and invoking the registered event handler; and automatically generating output code using the invoked event handler in parallel.

15. The system of claim 14, wherein the step of automatically generating a markup language description of the input class comprises the step of:

automatically generating an Extensible Markup Language description of the input class based on the extracted information identifying methods included in the input class; and for each method, the extracted information relating to parameters of the method including at least a name and a type of each parameter.

16. The system of claim 15, wherein the step of creating an event handler comprises the step of:

creating a Simple Application Programming Interface for Extensible Markup Language event handler that leverages multiple templates for a method node found in the Extensible Markup Language description.

17. The system of claim 16, wherein the step of registering the event handler comprises the step of:

registering the created Simple Application Programming Interface for Extensible Markup Language event handler for a method node found in the Extensible Markup Language description.

18. The system of claim 17, wherein the step of parsing the markup language description and invoking the registered event handler comprises the step of:

parsing the Extensible Markup Language description using a Simple Application Programming Interface for Extensible Markup Language parser and invoking the registered Simple Application Programming Interface for Extensible Markup Language event handler.

19. The system of claim 18, wherein the step of creating an event handler comprises the step of:

creating a plurality of event handlers that leverage multiple templates for a method node found in the Extensible Markup Language description.

20. The system of claim 19, wherein the step of registering the event handler comprises the step of:

registering each of the plurality of event handlers.

21. The system of claim 20, wherein the step of parsing the markup language description and invoking the registered event handler comprises the step of:

parsing the Extensible Markup Language description and invoking each of the plurality of registered event handlers.

22. The system of claim 21, wherein the step of automatically generating output code comprises the step of:

automatically generating output code using each of the plurality of invoked event handler in parallel.

23. The system of claim 22, wherein the step of automatically generating a markup language description of the input class comprises the step of:

automatically generating an Extensible Markup Language description of the input class based on the extracted information identifying methods included in the input class; and for each method, the extracted information relating to parameters of the method including at least a name and a type of each parameter.

24. The system of claim 23, wherein the step of creating a plurality of event handlers comprises the step of:

creating a plurality of Simple Application Programming Interface for Extensible Markup Language event handlers that leverage multiple templates for a method node found in the Extensible Markup Language description.

25. The system of claim 24, wherein the step of registering each of the plurality of event handlers comprises the step of:

registering the plurality of created Simple Application Programming Interface for Extensible Markup Language event handlers for a method node found in the Extensible Markup Language description.

26. The system of claim 25, wherein the step of parsing the markup language description and invoking the registered event handler comprises the step of:

parsing the Extensible Markup Language description using a Simple Application Programming Interface for Extensible Markup Language parser and invoking the plurality of registered Simple Application Programming Interface for Extensible Markup Language event handlers.

27. A computer program product for generating code to be deployed in an application server comprising:

a computer readable recordable-type medium; and computer program instructions, recorded on the computer readable recordable-type medium, executable by a processor, for performing the steps of:

receiving an archive file to be deployed, wherein the archive file includes at least one input class;

introspecting an input class included in the archive file, wherein introspecting the input class included in the archive file includes automatically generating information relating to the input class by extracting information identifying methods included in the input class; and for each method, extracting information relating to parameters of the method including at least a name and a type of each parameter;

automatically generating a markup language description of the input class based on the extracted information identifying methods included in the input class; and for each method, the extracted information relating to parameters of the method including at least a name and a type of each parameter;

creating an event handler that leverages multiple templates for a method node found in the markup language description;

registering the event handler;

parsing the markup language description and invoking the registered event handler; and automatically generating output code using the invoked event handler in parallel.

28. The computer program product of claim 27, wherein the step of automatically generating a markup language description of the input class comprises the step of:

automatically generating an Extensible Markup Language description of the input class based on the extracted information identifying methods included in the input class; and for each method, the extracted information relating to parameters of the method including at least a name and a type of each parameter.

29. The computer program product of claim 28, wherein the step of creating an event handler comprises the step of:

creating a Simple Application Programming Interface for Extensible Markup Language event handler that leverages multiple templates for a method node found in the Extensible Markup Language description.

30. The computer program product of claim 29, wherein the step of registering the event handler comprises the step of:

registering the created Simple Application Programming Interface for Extensible Markup Language event handler for a method node found in the Extensible Markup Language description.

31. The computer program product of claim 30, wherein the step of parsing the markup language description and invoking the registered event handler comprises the step of:

parsing the Extensible Markup Language description using a Simple Application Programming Interface for Extensible Markup Language parser and invoking the registered Simple Application Programming Interface for Extensible Markup Language event handler.

32. The computer program product of claim 27, wherein the step of creating an event handler comprises the step of:
creating a plurality of event handlers that leverage multiple templates for a method node found in the markup language description.

33. The computer program product of claim 32, wherein the step of registering the event handler comprises the step of:
registering each of the plurality of event handlers.

34. The computer program product of claim 33, wherein the step of parsing the markup language description and invoking the registered event handler comprises the step of:
parsing the markup language description and invoking each of the plurality of registered event handlers.

35. The computer program product of claim 34, wherein the step of automatically generating output code comprises the step of:
automatically generating output code using each of the plurality of invoked event handler in parallel.

36. The computer program product of claim 35, wherein the step of automatically generating a markup language description of the input class comprises the step of:
automatically generating an Extensible Markup Language description of the input class based on the extracted information identifying methods included in the input class; and for each method, the extracted information relating to parameters of the method including at least a name and a type of each parameter.

37. The computer program product of claim 36, wherein the step of creating a plurality of event handlers comprises the step of:
creating a plurality of Simple Application Programming Interface for Extensible Markup Language event handlers that leverage multiple templates for a method node found in the Extensible Markup Language description.

38. The computer program product of claim 37, wherein the step of registering each of the plurality of event handlers comprises the step of:
registering the plurality of created Simple Application Programming Interface for Extensible Markup Language event handlers for a method node found in the Extensible Markup Language description.

39. The computer program product of claim 38, wherein the step of parsing the markup language description and invoking the registered event handler comprises the step of:
parsing the Extensible Markup Language description using a Simple Application Programming Interface for Extensible Markup Language parser and invoking the plurality of registered Simple Application Programming Interface for Extensible Markup Language event handlers.

\* \* \* \* \*

UNITED STATES PATENT AND TRADEMARK OFFICE
CERTIFICATE OF CORRECTION

| | | |
|---|---|---|
| PATENT NO. | : 7,865,871 B2 | |
| APPLICATION NO. | : 10/730900 | |
| DATED | : January 4, 2011 | |
| INVENTOR(S) | : Jonathan Maron | |

It is certified that error appears in the above-identified patent and that said Letters Patent is hereby corrected as shown below:

In column 3, line 7, delete "EIS systems" and insert -- Enterprise Information Systems (EIS) --, therefor.

In column 3, line 8, delete "Enterprise Java Bean (EJB)" and insert -- ENTERPRISE JAVA BEAN® (EJB®) --, therefor.

In column 3, line 11, delete "EJB" and insert -- EJB® --, therefor.

In column 3, line 15, delete "EJB" and insert -- EJB® --, therefor.

In column 3, line 17, delete "EJB" and insert -- EJB® --, therefor.

In column 3, line 18, delete "EJB" and insert -- EJB® --, therefor.

In column 6, line 43, delete "processing instruction," and insert -- processingInstruction, --, therefor.

In column 7, line 20, delete "AttributeListlmpl," and insert -- AttributeListImpl, --, therefor.

In column 7, line 20, delete "LocatorlmpI" and insert -- LocatorImpl --, therefor.

In column 7, line 39, delete "AttributeListlmpl." and insert -- AttributeListImpl. --, therefor.

In column 8, line 2, delete "URIs" and insert -- URLs --, therefor.

Signed and Sealed this
Eighteenth Day of October, 2011

David J. Kappos
*Director of the United States Patent and Trademark Office*